Oct. 5, 1943.  O. S. PETTY  2,331,080
METHOD OF SEISMIC REFLECTION SURVEYING
Filed June 25, 1942
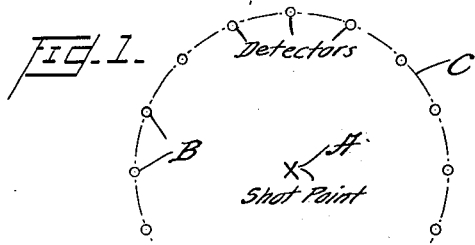
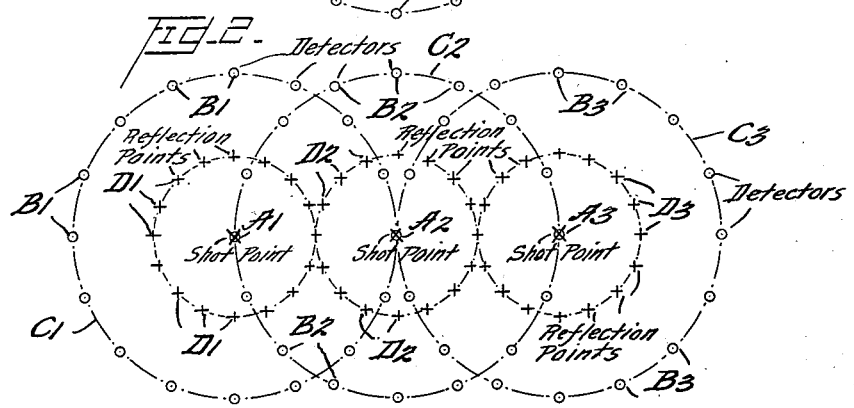
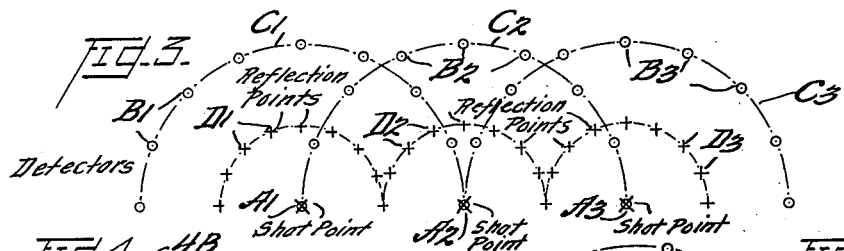
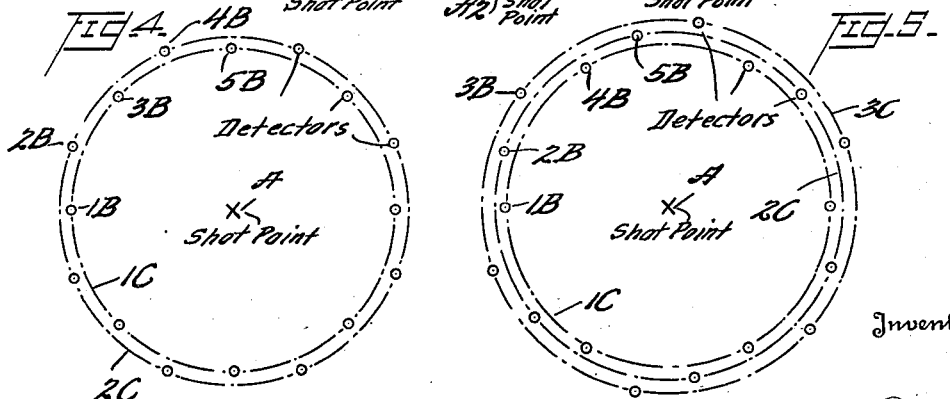
Inventor
Olive S. Petty
By Watson, Cole, Grindle & Watson
Attorney Patented Oct. 5, 1943

2,331,080

UNITED STATES PATENT OFFICE 2,331,080

METHOD OF SEISMIC REFLECTION SURVEYING

Olive S. Petty, San Antonio, Tex.

Application June 25, 1942, Serial No. 448,463

5 Claims. (Cl. 181—0.5)

This invention relates to improvements in reflection seismograph methods of geophysical exploration. It is the principal object of the invention to provide a method which produces records which may be more readily interpreted and which afford a more positive indication of the nature of sub-surface formations and more detailed information regarding the same than records produced by methods heretofore available.

It is conventional practice in reflection surveying of the type to which this invention relates to obtain information from which the character of sub-surface structures may be determined by propagating seismic waves in the earth, for example by detonating a charge of explosive at a selected point, called the "shot point," and by detecting, amplifying, and recording the resultant vibrational energy at a plurality of points on the surface which are spaced from each other and from the shot point. The instruments employed for the detection of the seismic impulses, sometimes referred to as detectors or seismometers, function to convert the vibrations into electrical energy, which is then suitably amplified by a thermionic valve amplifier, and thence delivered to an indicating or recording device, for example a string galvanometer.

In reflection shooting, the seismic waves originating at the shot point which are propagated downwardly are reflected back towards the surface at each interface between formations of different density, and the impulses so reflected from strata of different depths arrive successively at each of the detectors, the length of time elapsing between the firing of the shot and the arrival of the impulses at a given detector depending essentially on the density of the material traversed by the impulses and by the depth of the reflected bed.

One commonly used method involves the disposition of the plurality of detectors in substantially a straight line passing through the shot point, this being sometimes referred to as the "linear profile method." It will be appreciated that with such an arrangement the detector nearest the shot point will be the first to receive the waves reflected from a given, generally horizontal bed, and that the time of arrival of the same reflection at the other detectors will correspond generally to the distances of the detectors from the shot point, assuming that the structures traversed by the several reflected waves in reaching the respective detectors is generally uniform. It will also be understood that the distance from the shot point to the nearest and to the farthest detector may be subject to limitations imposed by the character of the sub-surface formations.

Thus if the distance from the shot point to the farthest detector is such that the path followed by the wave in travelling downward defines with the normal to the interface the critical angle as determined by the relative velocities of propagation of the wave in the two strata which form the interface, refraction rather than reflection of the waves will occur. This distance is referred to herein as the critical distance, and for reflection surveying the detectors are placed at a less distance from the shot point. Again, if the distance from the shot point to the nearest detector is too small, the disturbance commonly referred to as "ground roll," which travels relatively slowly in the earth's surface, will arrive during the reception of the reflected impulses and will obscure the record of the latter. While these are the principal limitations, other conditions may be encountered which dictate the permissible spacing of the detectors from the shot point. For example, the detectors must not be so far from the shot point that the direct high energy waves, which usually reach the detectors before the reflected waves, are so delayed that they interfere with or distort the reception of the reflected energy. This is especially important in the exploration of relatively shallow reflecting beds. Again, a record taken at a detector which is too far from the shot point may include reflections from a number of different areas, particularly in the case of faulting or steeply dipping beds. These and other limitations, often interfering with use of the linear profile method to the greatest advantage, are avoided in the practice of the present invention.

Thus it is a more specific object of the invention to provide, in a method of reflection seismograph exploration, for the detection of the seismic impulses at a plurality of points which are arranged substantially in a circular arc or a complete circle, with the shot point at about the center, the spacing between adjacent detectors in the circle, usually equal, being small as compared to the radius of the circle. Such an arrangement affords numerous advantages over more conventional methods. Thus it will be appreciated that since the detectors are arranged at generally the same distance from the shot point, this distance may be so selected as to fall well within the limitations imposed by sub-surface conditions, hereinbefore mentioned, and at the same time so as to permit the maximum coverage of sub-surface formations with a minimum number of shots. Thus conditions may be such that the detectors may be located not closer than 800 feet nor further than 900 feet from the shot point, so that in the practice of normal profiling methods, shot points every 100 feet down the line would be required for continuous coverage of the sub-surface. Under the same conditions, with the use of the present method, it will be appreciated that the sub-surface coverage on each shot is the full distance of 800 feet to 900 feet.

A further feature of the instant method is the ease with which slight changes in dip in any direction may be detected, since if weathering and surface topography are uniform, all reflections from horizontal beds occur on the record directly below one another, rather than with a "step out" as in the more conventional methods. If an even number of detectors are arranged in a complete circle, it is thus possible readily to compute the true dip in a number of different directions, equal to one-half the number of detectors employed. This is especially useful in the study of complicated geological structures such as saddles or in deriving the maximum information concerning simple conditions such as faults, either of which are difficult to locate by conventional methods. It is in such anomalies that oil deposits are frequently found, and it is therefore highly desirable in exploring for oil that the sub-surface structure be disclosed as completely as possible. Since the travel path for the reflections and the angle of reflection are the same at all detectors if the bed is flat, it is much easier to identify changes in character with changes in sub-surface. In normal profile shooting, the angle of reflection varies from the closest to the farthest detector, the character of the record is accordingly altered, and this variation in the record is difficult to interpret correctly.

The invention also contemplates the use of a circular arrangement of detectors, or circle spread, in conjunction with and as a supplement to other methods of shooting. For example, after an area has been covered by the normal reflection linear profile method and promising structure has thereby been located, it is possible in accordance with the present invention to determine the likelihood of drainage in any direction from the oil deposit so located by subsequent shooting with a circle spread. The method may also be applied, following coverage by linear profile methods, to obtain more detailed information regarding some portion of the area which is of special interest.

By reason of the fact that reflection from a horizontal bed produces a record in which there is no step-out between adjacent traces when the present method is practiced, resulting in greater similarity between the successive traces, the compounding of the energy arriving at several detectors for the purpose of eliminating stray vibrations and the like can be more successfully practiced. Compounding may be further improved by employing a modification of the basic method hereinbefore described, in which adjacent detectors in a circle spread are disposed at slightly different distances from the shot point, the difference in distance being such that compounding results in the maximum reduction of ground roll. In more conventional methods, unless more than one detector is used at each detector station, with resultant complication in the handling of the equipment, the distance between detectors is ordinarily too long for the proper reduction of ground roll by a factor of five to ten times.

In a further modification of the basic invention, especially suitable where continuous and detailed coverage is required, a series of shots are taken with circle spreads, each shot point being located on the circle spread of the preceding shot point. This method may be further modified by employment of semi-circular spreads for alternate shots, or by a full circle followed by two semi-circles, etc., these arrangements affording advantages in addition to those afforded by the basic arrangement first described.

Further objects and features of the invention will be apparent from the following description taken in connection with the accompanying drawing, in which Figure 1 is a plan view showing the distribution of the shot point and detectors in a simple circle spread;

Figure 2 is a similar view showing a slightly modified arrangement and indicating the points of reflection from a horizontal bed;

Figure 3 illustrates a modification of the arrangement shown in Figure 2;

Figure 4 is a view corresponding to Figure 1 in which the detectors are slightly offset for compounding, to eliminate ground roll; and Figure 5 illustrates a further development of the arrangement shown in Figure 4.

In order to facilitate an understanding of the invention, reference will be made to the several embodiments thereof illustrated in the accompanying drawing and specific language will be employed. It will nevertheless be understood that various further modifications of the methods and devices illustrated herein, such as would fall within the province of those skilled in the art to employ, are contemplated as part of the present invention.

In Figure 1 is illustrated the basic arrangement of detectors with which the method of the instant invention may be practiced. Referring first to Figure 1, it will be observed that the detectors B are arranged in a circle as indicated at C about a centrally disposed shot point A. The radius of circle C, the distance between adjacent detectors, and the number of detectors employed may be varied over a wide range. It is nevertheless obvious that as the number of detectors is increased, the derived information is more detailed and the determination of slight variations in dip and contour of sub-surface beds is facilitated. In order that adequate information may be secured by the practice of this method, and with the use of any of the arrangements of detectors illustrated herein, it is important that the distance between adjacent detectors shall not exceed the radius of the circle on which they are arranged, and I prefer that adjacent detectors be equally spaced and that the spacing be substantially less than the radius of the circle. In a particular case, for example, I have employed successfully a spacing between detectors of approximately 340 feet with a radius from the shot point of approximately 1750 feet.

In Figure 2 is illustrated one method of applying the present invention to a series of successive shots in such a way as to obtain maximum coverage. The successive shot points are here shown at A1, A2, and A3, and the detectors are arranged for these successive shots as indicated at B1, B2, and B3, respectively, each shot point lying on the circle C1, C2 defined by the detectors for the preceding shot. On the assumption that reflections are obtained from a horizontal bed, the points from which the impulses from the first shot point A1 are reflected are shown at D1, the reflection points for the shot point A2 at D2, and the reflection points for the shot point A3 at D3. It will be seen that by this method a linear profile on the line of the shot points is obtained, and at the same time dip in many directions from each shot point is indicated. It will be understood that the showing in the drawing is merely illustrative and that the firing of further shots, each located on the circle spread for the previous shot, may be continued indefinitely.

The arrangement shown in Figure 2 may be further modified by positioning the detectors in circular arcs or semi-circles on one side only of the line connecting the shot points, for example as shown in Figure 3, in which are employed reference characters corresponding to those of Figure 2. Here again accurate linear profiling is effected and dip is determined with reasonable accuracy and with the use of a less number of detectors. A combination of the arrangement shown in Figures 2 and 3 is also contemplated, in which circular and semi-circular spreads are alternated, or in which each circular spread is followed by two semi-circular spreads. In all such arrangements the detection points define a circle, the modifications involving the distribution of the points over the whole or over a part only of the circle, as may be desired.

In Figure 4 is illustrated a modification of Figure 1 in which two circle spreads, concentric with the shot point A, are employed. As hereinbefore explained, this arrangement facilitates compounding so as to eliminate the ground roll without the necessity of using more than one detector at each receiving station. The difference in radii of the two circles 1C and 2C may be quite small to correspond approximately to one-half the wave length of the ground roll, for example of the order of 20 to 25 feet, so as to obtain substantially complete elimination of ground roll, while maintaining a distance between adjacent detectors which is sufficiently large to assure rapid sub-surface coverage. If an even number of detectors are employed in this arrangement, compounding may be effected by combining the outputs of adjacent detectors. Thus the output of detectors 1B and 2B, the output of detectors 2B and 3B, and the output of detectors 3B and 4B may be combined and fed into separate traces on the record. Owing to the relatively small difference in distance from the shot point to adjacent traces, such compounding does not give rise to distortion such as occurs when normally spaced, linearly arranged detectors are compounded. In one such arrangement I have employed circles 1C and 2C having a radius from the shot point of 1750 feet and 1770 feet respectively with satisfactory results. Any conventional method of compounding or compositing may be employed, but I prefer to use the method disclosed in the application of Josephus O. Parr, Jr., Serial No. 398,166, filed June 14, 1941.

Figure 5 illustrates a further modification in which the arrangement of Figure 4 is extended to provide for the compounding of a greater number of detectors. Thus in this arrangement three circles 1C, 2C, and 3C concentric with shot point A are employed, every fourth detector being disposed on the same circle. With such an arrangement I may combine the outputs of detectors at 1B, 2B, and 3B, of detectors 2B, 3B, and 4B, etc., feeding the combined energy into separate traces. Further extensions of this arrangement, to combine multiple signals, will be obvious from the foregoing.

The detectors, amplifiers, and recorders employed in the practice of the invention may be constructed in any conventional manner. I prefer to use detectors of the capacitive type, for instance as shown in the application of Olive S. Petty Serial No. 324,013, filed March 14, 1940, and amplifiers constructed and functioning as shown in the application of Olive S. Petty, Serial No. 290,928, filed August 18, 1939, to record the amplified energy by the usual multiple string galvanometer provided with conventional recording means.

Having thus described the invention, what is claimed as new and desired to be secured by Letters Patent is:

1. A method of reflection seismograph surveying, which includes the steps of detonating an explosive charge at a first point adjacent the surface to propagate seismic waves in the earth, detecting the reflections of said waves from subsurface formations at a plurality of spaced second points adjacent the surface and arranged to form a complete circle of which said first point is substantially at the center, the spacing between adjacent second points being less than the radius of said circle and the radius being less than the critical distance corresponding to the critical reflecting angle, and amplifying and recording the wave reflections so detected.

2. A method of reflection seismograph surveying, which includes the steps of detonating an explosive charge at a first point adjacent the surface to propagate seismic waves in the earth, detecting the reflections of said waves from subsurface formations at a plurality of spaced second points adjacent the surface and defining generally a plurality of concentric circles of which said first point is substantially at the center, adjacent second points being disposed on different arcs and having a spacing less than the radius of that arc of least radius, the difference between said radii being small as compared to the radii, the greatest radius being less than the critical distance corresponding to the critical reflecting angle, converting the wave reflections detected at said points into electrical energy, combining energy derived from adjacent points, and recording the combined energy.

3. A method of reflection seismograph surveying, which includes the steps of detonating an explosive charge at a first point adjacent the surface to propagate seismic waves in the earth, detecting the reflections of said waves from subsurface formations at a plurality of spaced second points adjacent the surface and defining generally a plurality of concentric circles of which said first point is substantially at the center, adjacent second points being disposed on different circles and having a spacing less than the radius of the least circle, the difference between said radii being approximately such that the ground roll arrives at the respective circles out of phase, the radius of the greatest circle being less than the critical distance corresponding to the critical reflecting angle, and compounding energy from detectors on different circles.

4. A method of reflection seismograph surveying, which includes the steps of detonating an explosive charge at a first point adjacent the surface to propagate seismic waves in the earth, detecting the reflections of said waves from subsurface formations at a plurality of spaced second points adjacent the surface and arranged to form a complete circle of which said first point is substantially at the center, the spacing between adjacent second points being less than the radius of said circle and the radius being less than the critical distance corresponding to the critical reflecting angle, thereafter detonating a second explosive charge at a selected one of said second points on said first circle, detecting the reflections of the waves so propagated at a plurality of further points adjacent said surface and defining generally a second circle of equal radius of which said selected point is substantially at the center, the spacing between adjacent ones of said further points being less than the radius, and amplifying and recording the wave reflections so detected.

5. The method recited in claim 4, in which the points of detection are substantially equally spaced about each of said circles to form complete circle spreads.

OLIVE S. PETTY.